United States Patent
Wang (10) Patent No.: US 9,049,760 B2
(45) Date of Patent: Jun. 2, 2015

(54) PFC LED DRIVER HAVING A FLICKER CONTROL MECHANISM

(71) Applicant: IMMENSE ADVANCE TECHNOLOGY CORP., New Taipei (TW)

(72) Inventor: Yen-Hui Wang, New Taipei (TW)

(73) Assignee: IMMENSE ADVANCE TECHNOLOGY CORP., New Taipei (TW)

( * ) Notice: Subject to any disclaimer, the term of this patent is extended or adjusted under 35 U.S.C. 154(b) by 134 days.

(21) Appl. No.: 13/794,278

(22) Filed: Mar. 11, 2013

(65) Prior Publication Data

US 2014/0252969 A1    Sep. 11, 2014

(51) Int. Cl.
H05B 37/02    (2006.01)
H05B 33/08    (2006.01)

(52) U.S. Cl.
CPC ........ *H05B 33/0809* (2013.01); *H05B 33/0851* (2013.01); *Y02B 20/348* (2013.01)

(58) Field of Classification Search
CPC ........... H05B 33/0815; H05B 33/0845; H05B 33/08; H05B 33/0809; H05B 37/00; H05B 37/02

USPC ............. 315/200 R, 224, 247, 276, 291, 307, 315/308, 310

See application file for complete search history.

(56) References Cited

U.S. PATENT DOCUMENTS

| | | | |
|---|---|---|---|
| 2010/0219764 A1* | 9/2010 | Yamasaki et al. | 315/224 |
| 2011/0309759 A1* | 12/2011 | Shteynberg et al. | 315/201 |
| 2012/0181941 A1* | 7/2012 | Kimura et al. | 315/200 R |
| 2012/0286696 A1* | 11/2012 | Ghanem | 315/291 |

* cited by examiner

*Primary Examiner* — Douglas W Owens
*Assistant Examiner* — Thai Pham
(74) *Attorney, Agent, or Firm* — Ming Chow; Sinorica, LLC (57) ABSTRACT

A PFC LED driver having a flicker control mechanism, including: a bridge rectifier, used to generate a full-wave-rectified line input voltage according to an AC power; a single stage PFC constant average current converter, coupled with the bridge rectifier and used for forcing an input current to track the full-wave-rectified line input voltage and regulating an average value of an output current at a first preset value; and a current ripple reducing unit, in series with an LED module to form a load for the output current to flow through, wherein the current ripple reducing unit has a negative feedback control mechanism for forcing a peak of the output current approach an average value of the output current.

4 Claims, 8 Drawing Sheets

PFC LED DRIVER HAVING A FLICKER CONTROL MECHANISM

BACKGROUND OF THE INVENTION

1. Field of the Invention

The present invention relates to a PFC (power factor correction) LED (light emitting diode) driver, especially to a PFC LED driver having a flicker control mechanism.

2. Description of the Related Art

In present LED lighting applications, LED drivers are generally required to provide a PFC (power factor correction) function, that is, to make an input current in phase with a full-wave-rectified line input voltage. However, an output current flowing through an LED module will thereby tend to have a large current ripple, which causes an annoying flicker phenomenon and degrades luminous efficiency.

Figure 1:
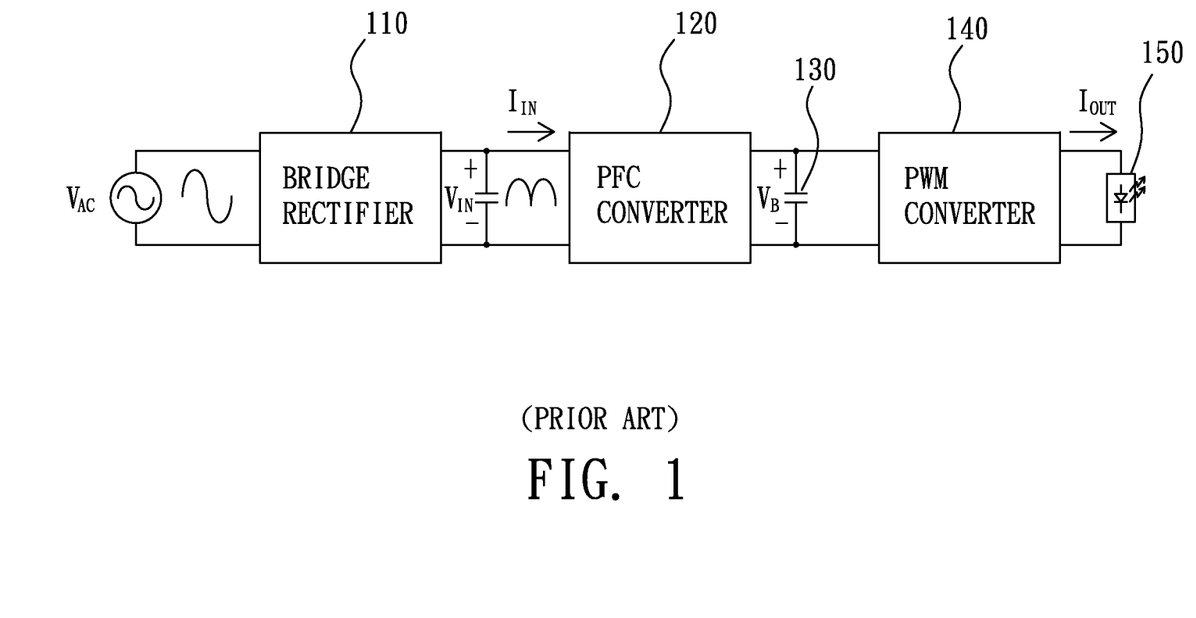
FIG. 1 illustrates a block diagram of a prior art LED driver having a two-stage PFC architecture.

To reduce the current ripple of an LED current, one solution is to utilize a two-stage PFC architecture. Please refer to FIG. 1, which illustrates a block diagram of a prior art LED driver having a two-stage PFC architecture. As illustrated in FIG. 1, the prior art LED driver includes a bridge rectifier 110, a PFC converter 120, a bulk capacitor 130, and a PWM converter 140, and an LED module 150 is driven by the prior art LED driver.

The bridge rectifier 110 is used to generate a full-wave-rectified line input voltage $V_{IN}$ according to an AC power $V_{AC}$.

The PFC converter 120 is used to force an input current $I_{IN}$ to track the full-wave-rectified line input voltage $V_{IN}$ to achieve power factor correction, and at the same time provide a loosely regulated DC voltage $V_B$ on the bulk capacitor 130.

The PWM converter 140, of which the operation is independent of that of the PFC converter 120, is used to convert the loosely regulated DC voltage $V_B$ to a DC current $I_{OUT}$ to drive the LED module 150.

Although the two-stage PFC architecture is capable of providing a required power factor and reducing the current ripple of an output current, and thereby the flicker, for an LED module, it has the disadvantages of being expensive and bulky.

Another solution is to utilize a single stage PFC constant average current converter to drive an LED module with a very large capacitor in parallel with the LED module. The single stage PFC constant average current converter is responsible for forcing an input current to track a full-wave-rectified line input voltage and regulating the average value of an output current at a preset value for the LED module, and the very large capacitor is responsible for reducing the current ripple of the output current. However, the very large capacitor is bulky and its performance on ripple reduction is still not good enough.

To solve the foregoing problems, a novel PFC LED driver is needed.

SUMMARY OF THE INVENTION

One objective of the present invention is to disclose a PFC LED driver capable of reducing the current ripple of LEDs to prevent a flicker phenomenon.

Another objective of the present invention is to disclose a PFC LED driver capable of reducing the current ripple of LEDs to improve the luminous efficiency without compromising the power factor.

Another objective of the present invention is to disclose a PFC LED driver capable of reducing flicker, which can be implemented with a low cost and a small size.

Still another objective of the present invention is to disclose a PFC LED driver capable of reducing flicker, which is easy to design.

To attain the foregoing objectives, a PFC LED driver having a flicker control mechanism is proposed, including:

a bridge rectifier, used to generate a full-wave-rectified line input voltage according to an AC power;

a single stage PFC constant average current converter, coupled with the bridge rectifier and used for forcing an input current to track the full-wave-rectified line input voltage and regulating an average value of an output current at a first preset value; and a current ripple reducing unit, in series with an LED module to form a load for the output current to flow through, wherein the current ripple reducing unit has a negative feedback control mechanism for forcing a peak of the output current approach an average value of the output current.

In one embodiment, the current ripple reducing unit includes:

a first NMOS transistor, having a first gate, a first drain, and a first source, the first gate being coupled with the first drain;

a first resistor, having one end coupled with the first source, and another end coupled to a ground;

a second NMOS transistor, having a second gate, a second drain, and a second source, the second gate being coupled with the first gate, and the second drain being coupled with the LED module;

a second resistor, having one end coupled with the second source, and another end coupled to the ground;

a peak detector, having an input coupled with the second source, and an output for providing a first voltage corresponding to a peak value of the output current;

a low-pass filter, having an input coupled with the second source, and an output for providing a second voltage corresponding to an average value of the output current;

a comparator, having a positive input for receiving the first voltage, a negative input for receiving the second voltage, and an output for providing a comparison signal; and a variable peak current setting unit, having an input for receiving the comparison signal, and an output coupled with the first drain for providing a peak control current, wherein the peak control current increases/decreases as a high level period of the comparison signal decreases/increases.

In one embodiment, the peak detector includes:

a diode, having an anode coupled with the second source, and a cathode coupled to the output of the peak detector;

a first capacitor, having one end coupled with the cathode of the diode, and another end coupled to the ground; and a discharging resistor, having one end coupled with the cathode of the diode, and another end coupled to the ground.

In one embodiment, the low-pass filter includes:

a third resistor, having a first end coupled with the second source, and a second end coupled to the output of the low-pass filter; and a second capacitor, having one end coupled with the second end of the third resistor, and another end coupled to the ground.

In one embodiment, the variable peak current setting unit includes:

a first current source, having an output for providing a first constant current;

a switch, having a control end, a first channel end, and a second channel end, the control end being used for receiving the comparison signal, and the first channel end being coupled with the output of the first current source;

a third capacitor, having one end coupled with the second channel end, and another end coupled to the ground;

a fourth resistor, having one end coupled with the second channel end, and another end coupled to the ground;

an amplifier, having a positive input, a negative input, and an output, the positive input being coupled with the second channel end;

a third NMOS transistor, having a third gate, a third drain, and a third source, the third gate being coupled with the output of the amplifier, the third drain being coupled to the output of the variable peak current setting unit, and the third source being coupled with the negative input of the amplifier;

a fifth resistor, having one end coupled with the third source, and another end coupled to the ground; and a second current source, having an output for providing a second constant current, the output of the second current source being coupled with the output of the variable peak current setting unit.

To attain the foregoing objectives, another PFC LED driver having a flicker control mechanism is proposed, including:

a bridge rectifier, used to generate a full-wave-rectified line input voltage according to an AC power;

a single stage PFC constant average current converter, coupled with the bridge rectifier and used for forcing an input current to track the full-wave-rectified line input voltage and regulating an average value of an output current at a first preset value; and a current ripple reducing unit, in series with an LED module to form a load for the output current to flow through, the current ripple reducing unit including:

an amplifier, having a positive input, a negative input, and an output;

an NMOS transistor, having a gate, a drain, and a source, the gate being coupled with the output of the amplifier, the drain being coupled with the LED module, and the source being coupled with the positive input of the amplifier;

a first resistor, having one end coupled with the source of the NMOS transistor, and another end coupled to a ground;

a peak detector, having an input coupled with the source of the NMOS transistor, and an output for providing a first voltage corresponding to a peak value of the output current;

a low-pass filter, having an input coupled with the source of the NMOS transistor, and an output for providing a second voltage corresponding to an average value of the output current;

a comparator, having a positive input for receiving the first voltage, a negative input for receiving the second voltage, and an output for providing a comparison signal; and a variable peak current setting unit, having an input for receiving the comparison signal, and an output for providing a peak control voltage to the negative input of the amplifier, wherein the peak control voltage increases/decreases as a high level period of the comparison signal increases/decreases.

In one embodiment, the variable peak current setting unit includes:

a first current source, having an output for providing a first constant current;

a switch, having a control end, a first channel end, and a second channel end, the control end being used for receiving the comparison signal, the first channel end being coupled with the output of the first current source, the second channel end being coupled to the output of the variable peak current setting unit;

a capacitor, having one end coupled with the second channel end, and another end coupled to the ground; and a second resistor, having one end coupled with the second channel end, and another end coupled to the ground.

To attain the foregoing objectives, still another PFC LED driver having a flicker control mechanism is proposed, including:

a bridge rectifier, used to generate a full-wave-rectified line input voltage according to an AC power;

a single stage PFC constant average current converter, coupled with the bridge rectifier and used for forcing an input current to track the full-wave-rectified line input voltage and regulating an average value of an output current at a first preset value; and a current ripple reducing unit, in series with an LED module to form a load for the output current to flow through, the current ripple reducing unit including:

a first amplifier, having a first positive input, a first negative input, and a first output;

a first NMOS transistor, having a gate coupled with the first output of the first amplifier, a drain coupled with the LED module, and a source coupled with the first negative input of the first amplifier;

a first resistor, having one end coupled with the source of the first NMOS transistor, and another end coupled to a ground;

a peak detector, having an input coupled with the source of the first NMOS transistor, and an output for providing a first voltage corresponding to a peak value of the output current;

a low-pass filter, having an input coupled with the source of the first NMOS transistor, and an output for providing a second voltage corresponding to an average value of the output current;

a comparator, having a positive input for receiving the first voltage, a negative input for receiving the second voltage, and an output for providing a comparison signal; and a variable peak current setting unit, having an input for receiving the comparison signal, and an output for providing a peak control voltage to the first positive input of the first amplifier, wherein the peak control voltage decreases/increases as a high level period of the comparison signal increases/decreases.

In one embodiment, the variable peak current setting unit includes:

a first current source, having an output for providing a first constant current;

a switch, having a control end, a first channel end, and a second channel end, the control end being used for receiving the comparison signal, and the first channel end being coupled with the output of the first current source;

a capacitor, having one end coupled with the second channel end, and another end coupled to the ground;

a second resistor, having one end coupled with the second channel end, and another end coupled to the ground;

a second amplifier, having a second positive input, a second negative input, and a second output, the second positive input being coupled with the second channel end;

a second NMOS transistor, having a second gate, a second drain, and a second source, the second gate being coupled with the second output of the second amplifier, the second drain being coupled to the output of the variable peak current setting unit, and the second source being coupled with the second negative input of the second amplifier;

a third resistor, having one end coupled with the second source, and another end coupled to the ground;

a second current source, having an output for providing a second constant current, the output of the second current source being coupled with the output of the variable peak current setting unit; and a fourth resistor, having one end coupled with the output of the second current source, and another end coupled to the ground.

To make it easier for our examiner to understand the objective of the invention, its structure, innovative features, and performance, we use preferred embodiments together with the accompanying drawings for the detailed description of the invention.

DETAILED DESCRIPTION OF THE PREFERRED EMBODIMENTS

The present invention will be described in more detail hereinafter with reference to the accompanying drawings that show the preferred embodiments of the invention.

Figure 2:
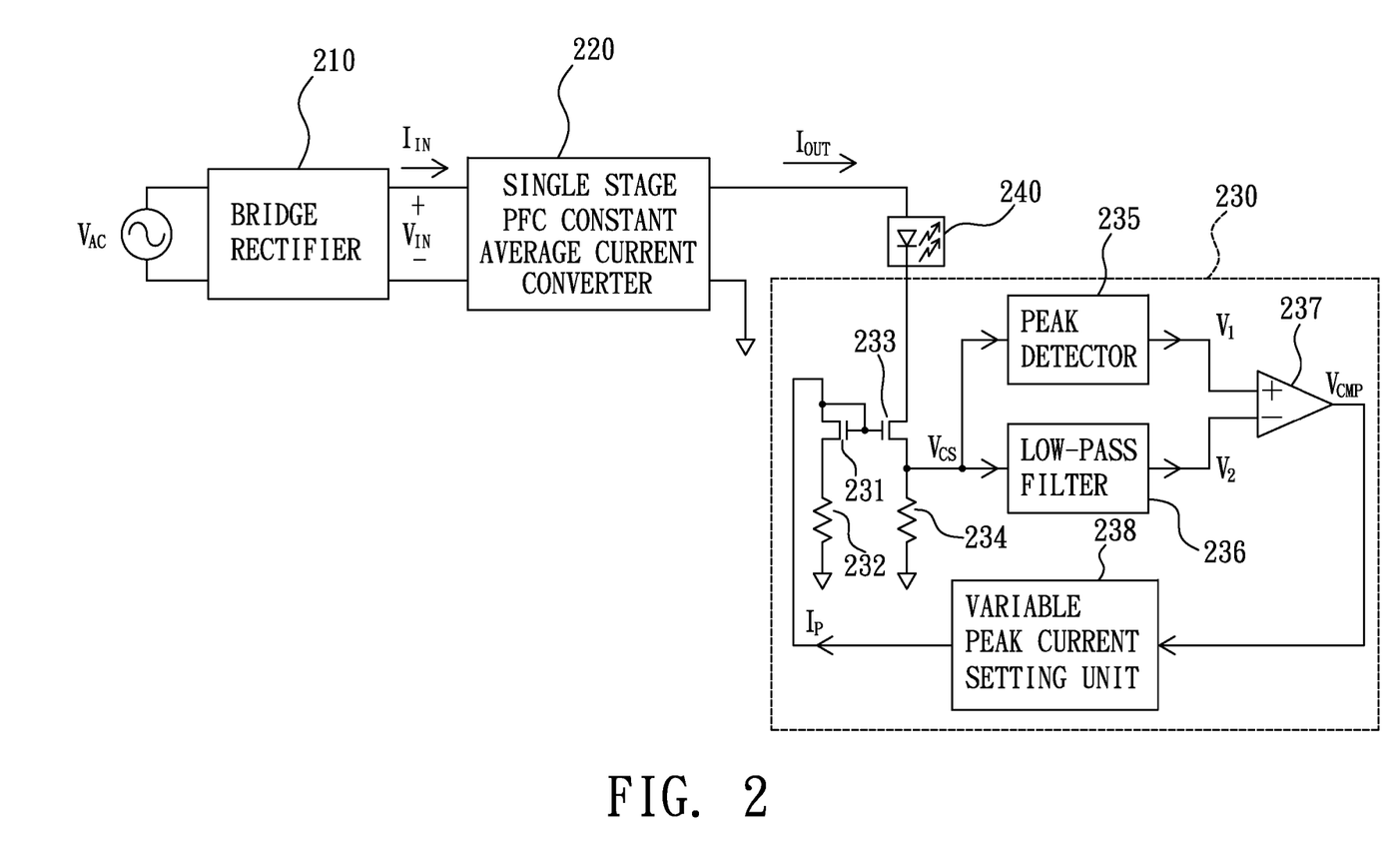
FIG. 2 illustrates a block diagram of a PFC LED driver having a flicker control mechanism according to a preferred embodiment of the present invention.

Please refer to FIG. 2, which illustrates a block diagram of a PFC LED driver having a flicker control mechanism according to a preferred embodiment of the present invention. As illustrated in FIG. 2, the PFC LED driver having a flicker control mechanism includes a bridge rectifier 210, a single stage PFC constant average current converter 220, and a current ripple reducing unit 230, and an LED module 240 is driven by the PFC LED driver.

The bridge rectifier 210 is used to generate a full-wave-rectified line input voltage $V_{IN}$ according to an AC power $V_{AC}$.

The single stage PFC constant average current converter 220, coupled with the bridge rectifier 210, is responsible for forcing an input current $I_{IN}$ to track the full-wave-rectified line input voltage $V_{IN}$ and regulating the average value of an output current $I_{OUT}$ at a first preset value. The single stage PFC constant average current converter 220 can be of a buck type, a buck-boost type, or a fly-back type.

The current ripple reducing unit 230, in series with the LED module 240 to form a load for the output current $I_{OUT}$ to flow through, has a negative feedback control mechanism for forcing a peak of the output current $I_{OUT}$ to approach an average value of the output current $I_{OUT}$ to reduce the current ripple of the output current $I_{OUT}$, and thereby reduce the flicker of the LED module 240. The principle is as follows:

When in operation, the single stage PFC constant average current converter 220 will force the input current $I_{IN}$ to be in phase with the full-wave-rectified line input voltage $V_{IN}$, and make the average value of the output current $I_{OUT}$ approach the first preset value. In the mean time, the current ripple reducing unit 230 uses a negative feedback control mechanism to force the peak of the output current $I_{OUT}$ to approach the average value of the output current $I_{OUT}$. As a result, the ripple of the output current $I_{OUT}$ decreases to nearly zero, and in this situation, the ripple of the input current $I_{IN}$ is forced to be absorbed by a capacitor (typically 100-200 μF) in the single stage PFC constant average current converter 220.

The current ripple reducing unit 230 includes a first NMOS transistor 231, a first resistor 232, a second NMOS transistor 233, a second resistor 234, a peak detector 235, a low-pass filter 236, a comparator 237, and a variable peak current setting unit 238.

The first NMOS transistor 231 has a first gate, a first drain, and a first source, the first gate being coupled with the first drain. The first resistor 232 has one end coupled with the first source, and another end coupled to a ground.

The second NMOS transistor 233 has a second gate, a second drain, and a second source, the second gate being coupled with the first gate, and the second drain being coupled with the LED module 240. Besides, the second NMOS transistor 233 has a second channel width to channel length ratio $(W/L)_2$, which is N times the value of a first channel width to channel length ratio $(W/L)_1$ of the first NMOS transistor 231, wherein N is preferably a large number like 100. The second resistor 234 has one end coupled with the second source, and another end coupled to the ground. Preferably, the second resistor 234 has a second resistance, which is N times the value of a first resistance of the first resistor 232.

The peak detector 235 has an input coupled with the second source, and an output for providing a first voltage $V_1$ corresponding to a peak value of the output current $I_{OUT}$.

The low-pass filter 236 has an input coupled with the second source, and an output for providing a second voltage $V_2$ corresponding to an average value of the output current $I_{OUT}$.

The comparator 237 has a positive input for receiving the first voltage $V_1$, a negative input for receiving the second voltage $V_2$, and an output for providing a comparison signal $V_{CMP}$.

The variable peak current setting unit 238 has an input for receiving the comparison signal $V_{CMP}$, and an output coupled with the first drain for providing a peak control current $I_P$, wherein the peak control current $I_P$ increases/decreases as a high level period of the comparison signal $V_{CMP}$ decreases/increases.

Figure 3:
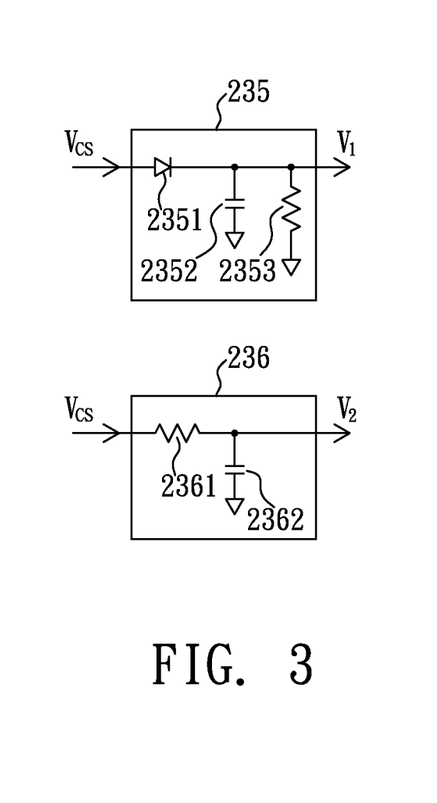
FIG. 3 illustrates one embodiment of a peak detector of FIG. 2 and one embodiment of the low-pass filter of FIG. 2.

FIG. 3 illustrates one embodiment of the peak detector 235 and one embodiment of the low-pass filter 236. As illustrated in FIG. 3, the peak detector 235 includes a diode 2351, a first capacitor 2352, and a discharging resistor 2353.

The diode 2351 has an anode coupled with the second source, and a cathode coupled to the output of the peak detector 235; the first capacitor 2352 has one end coupled with the cathode of the diode 2351, and another end coupled to the ground; and the discharging resistor 2353 has one end coupled with the cathode of the diode 2351, and another end coupled to the ground.

The low-pass filter 236 includes a third resistor 2361 and a second capacitor 2362.

The third resistor 2361 has a first end coupled with the second source, and a second end coupled to the output of the low-pass filter 236; and the second capacitor 2362 has one end coupled with the second end of the third resistor 2361, and another end coupled to the ground.

Figure 4:
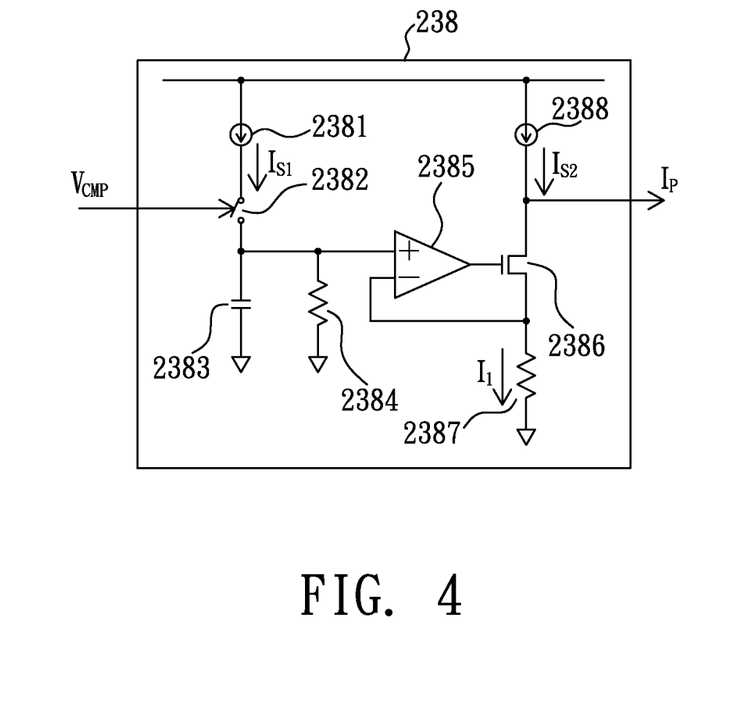
FIG. 4 illustrates one embodiment of a variable peak current setting unit of FIG. 2.

FIG. 4 illustrates one embodiment of the variable peak current setting unit 238. As illustrates in FIG. 4, the variable peak current setting unit 238 includes a first current source 2381, a switch 2382, a third capacitor 2383, a fourth resistor 2384, an amplifier 2385, a third NMOS transistor 2386, a fifth resistor 2387, and a second current source 2388.

The first current source 2381 has an output for providing a first constant current $I_{S1}$.

The switch 2382 has a control end, a first channel end, and a second channel end, the control end being used for receiving the comparison signal $V_{CMP}$, and the first channel end being coupled with the output of the first current source 2381.

The third capacitor 2383 has one end coupled with the second channel end, and another end coupled to the ground.

The fourth resistor 2384 has one end coupled with the second channel end, and another end coupled to the ground.

The amplifier 2385 has a positive input, a negative input, and an output, the positive input being coupled with the second channel end.

The third NMOS transistor 2386 has a third gate, a third drain, and a third source, the third gate being coupled with the output of the amplifier 2385, the third drain being coupled to the output of the variable peak current setting unit 238, and the third source being coupled with the negative input of the amplifier 2385.

The fifth resistor 2387 has one end coupled with the third source, and another end coupled to the ground.

The second current source 2388 has an output for providing a second constant current $I_{S2}$, the output of the second current source 2388 being coupled with the output of the variable peak current setting unit 238.

When the comparison signal $V_{CMP}$ is at a high level, the switch 2382 will be switched on, and the first constant current $I_{S1}$ will charge the third capacitor 2383 to generate a peak control voltage $V_P$, which in turn causes a current $I_1$ to through the fifth resistor 2387, wherein $I_1 = V_P/$(the resistance of the fifth resistor 2387), and $V_P$ is proportional to the period the comparison signal $V_{CMP}$ stays at the high level. As the peak control current $I_P$ is equal to $(I_{S2} - I_1)$, therefore, the longer the comparison signal $V_{CMP}$ stays at the high level, the smaller the peak control current $I_P$ will be.

Due to a negative feedback control mechanism of the current ripple reducing unit 230, the first voltage $V_1$ at the positive input of the comparator 237 will approach the second voltage $V_2$ at the negative input of the comparator 237 to force the peak of the output current $I_{OUT}$ to be close to the average value of the output current $I_{OUT}$. As a result, the current ripple of the output current $I_{OUT}$ is reduced to near zero, and the flicker effect is therefore eliminated. The negative feedback mechanism is explained as follows:

1. Given a value of the peak control current $I_P$, the second NMOS transistor 233 will set an upper bound for the output current $I_{OUT}$. When the single stage PFC constant average current converter 220 allows a current value higher than the upper bound for the output current $I_{OUT}$ during a high voltage interval of the full-wave-rectified line input voltage $V_{IN}$, the second drain of the second NMOS transistor 233 will exhibit a high impedance and the output current $I_{OUT}$ will be equal to the upper bound. When the single stage PFC constant average current converter 220 cannot allow a current value higher than the upper bound for the output current $I_{OUT}$ during a low voltage interval of the full-wave-rectified line input voltage $V_{IN}$, the second NMOS transistor 233 will enter a triode region and the value of the output current $I_{OUT}$ will be determined by the single stage PFC constant average current converter 220, and a corresponding valley value of the output current $I_{OUT}$ will be automatically determined to make the average value of the output current $I_{OUT}$ equal to the first preset value.
2. When the first voltage $V_1$ is higher than the second voltage $V_2$, the comparison signal $V_{CMP}$ will be at a high level to reduce the peak control current $I_P$, and the peak of the output current $I_{OUT}$ will drop accordingly. When the first voltage $V_1$ is lower than the second voltage $V_2$, the comparison signal $V_{CMP}$ will be at a low level to increase the peak control current $I_P$, and the peak of the output current $I_{OUT}$ will shift up accordingly.
3. In steady state, the peak of the output current $I_{OUT}$ will be equal to the average value of the output current $I_{OUT}$, and the ripple of the output current $I_{OUT}$ is therefore reduced to near zero.

Figure 5:
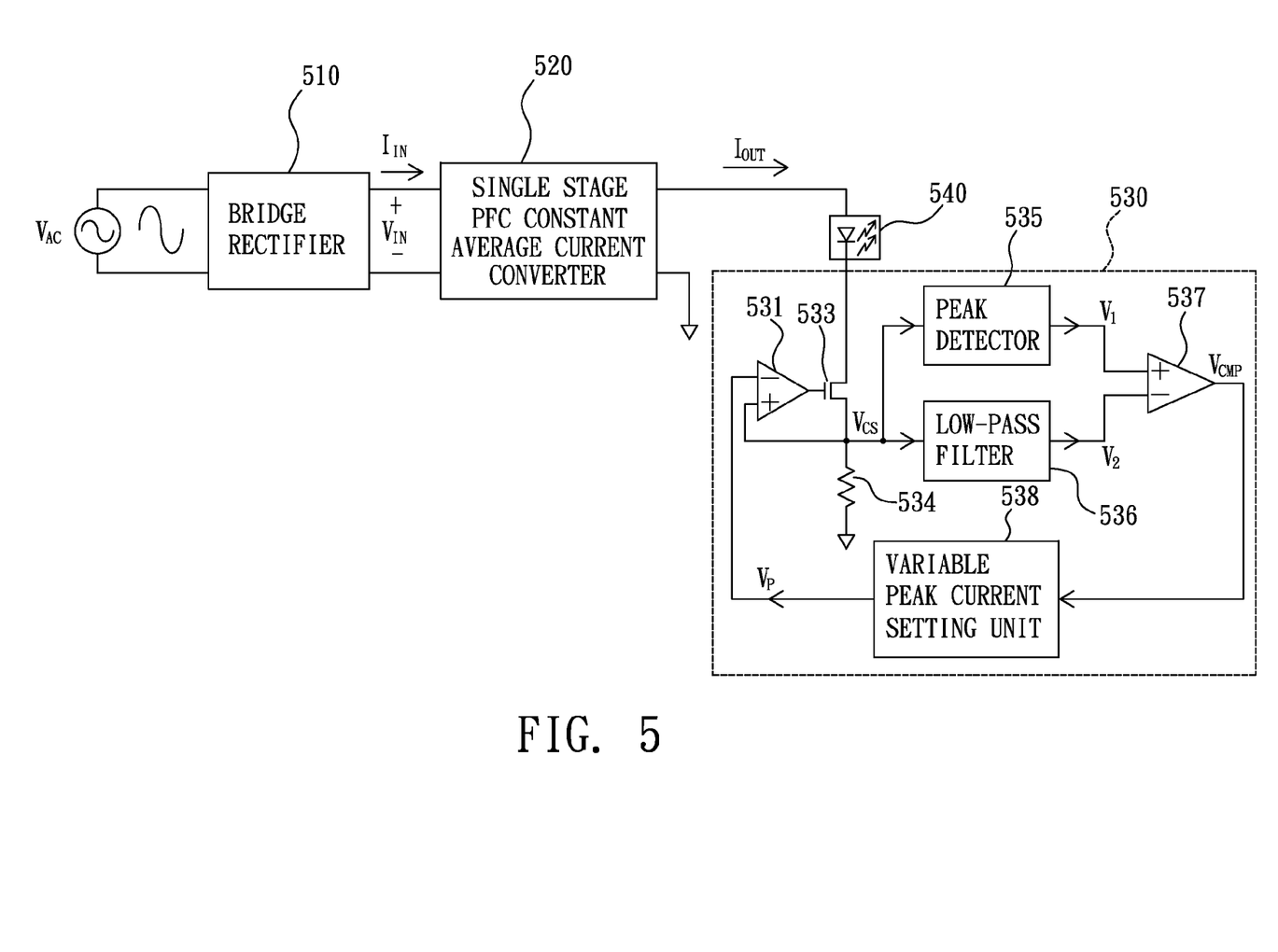
FIG. 5 illustrates a block diagram of a PFC LED driver having a flicker control mechanism according to another preferred embodiment of the present invention.

FIG. 5 illustrates a block diagram of a PFC LED driver having a flicker control mechanism according to another preferred embodiment of the present invention. As illustrated in FIG. 5, the PFC LED driver having a flicker control mechanism includes a bridge rectifier 510, a single stage PFC constant average current converter 520, and a current ripple reducing unit 530, and an LED module 540 is driven by the PFC LED driver.

The bridge rectifier 510 is used to generate a full-wave-rectified line input voltage $V_{IN}$ according to an AC power $V_{AC}$.

The single stage PFC constant average current converter 520, coupled with the bridge rectifier 510, is responsible for forcing an input current $I_{IN}$ to track the full-wave-rectified line input voltage $V_{IN}$ and regulating the average value of an output current $I_{OUT}$ at a first preset value. The single stage PFC constant average current converter 520 can be of a buck type, a buck-boost type, or a fly-back type.

The current ripple reducing unit 530, in series with the LED module 540 to form a load for the output current $I_{OUT}$ to flow through, has a negative feedback control mechanism for forcing a peak of the output current $I_{OUT}$ to approach an average value of the output current $I_{OUT}$ to reduce the current ripple of the output current $I_{OUT}$, and thereby reduce the flicker of the LED module 540. The principle is as follows:

When in operation, the single stage PFC constant average current converter 520 will force the input current $I_{IN}$ to be in phase with the full-wave-rectified line input voltage $V_{IN}$, and make the average value of the output current $I_{OUT}$ approach the first preset value. In the mean time, the current ripple reducing unit 530 uses a negative feedback control mechanism to force the peak of the output current $I_{OUT}$ to approach the average value of the output current $I_{OUT}$. As a result, the ripple of the output current $I_{OUT}$ decreases to nearly zero, and in this situation, the ripple of the input current $I_{IN}$ is forced to be absorbed by a capacitor (typically 100-200 μF) in the single stage PFC constant average current converter 520.

The current ripple reducing unit 530 includes an amplifier 531, an NMOS transistor 533, a first resistor 534, a peak detector 535, a low-pass filter 536, a comparator 537, and a variable peak current setting unit 538.

The amplifier 531 has a negative input, a positive input, and an output. The NMOS transistor 533 has a gate, a drain, and a source, the gate being coupled with the output of the amplifier 531, the drain being coupled with the LED module 540, and the source being coupled with the positive input of the amplifier 531. The first resistor 534 has one end coupled with the source of the NMOS transistor 533, and another end coupled to a ground.

The peak detector 535 has an input coupled with the source of the NMOS transistor 533, and an output for providing a first voltage $V_1$ corresponding to a peak value of the output current $I_{OUT}$.

The low-pass filter 536 has an input coupled with the source of the NMOS transistor 533, and an output for providing a second voltage $V_2$ corresponding to an average value of the output current $I_{OUT}$.

The comparator 537 has a positive input for receiving the first voltage $V_1$, a negative input for receiving the second voltage $V_2$, and an output for providing a comparison signal $V_{CMP}$.

The variable peak current setting unit 538 has an input for receiving the comparison signal $V_{CMP}$, and an output for providing a peak control voltage $V_P$ to the negative input of the amplifier 531, wherein the peak control voltage $V_P$ increases/decreases as a high level period of the comparison signal $V_{CMP}$ increases/decreases.

Figure 6:
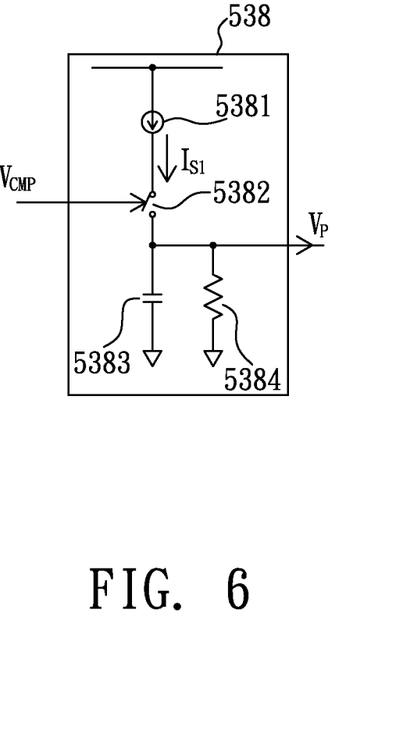
FIG. 6 illustrates one embodiment of a variable peak current setting unit of FIG. 5.

FIG. 6 illustrates one embodiment of the variable peak current setting unit 538. As illustrates in FIG. 6, the variable peak current setting unit 538 includes a current source 5381, a switch 5382, a capacitor 5383, and a second resistor 5384.

The current source 5381 has an output for providing a constant current $I_{S1}$.

The switch 5382 has a control end, a first channel end, and a second channel end, the control end being used for receiving the comparison signal $V_{CMP}$, and the first channel end being coupled with the output of the current source 5381.

The capacitor 5383 has one end coupled with the second channel end, and another end coupled to the ground.

The second resistor 5384 has one end coupled with the second channel end, and another end coupled to the ground.

When the comparison signal $V_{CMP}$ is at a high level, the switch 5382 will be switched on, and the constant current $I_{S1}$ will charge the capacitor 5383 to generate a peak control voltage $V_P$, which is proportional to the period the comparison signal $V_{CMP}$ stays at the high level. As the output of the amplifier 531 is inversely proportional to $V_P$, therefore, the longer the comparison signal $V_{CMP}$ stays at the high level, the lower the upper bound of the output current $I_{OUT}$ will be.

Due to a negative feedback control mechanism of the current ripple reducing unit 530, the first voltage $V_1$ at the positive input of the comparator 537 will approach the second voltage $V_2$ at the negative input of the comparator 537 to force the peak of the output current $I_{OUT}$ to be close to the average value of the output current $I_{OUT}$. As a result, the current ripple of the output current $I_{OUT}$ is reduced to near zero, and the flicker effect is therefore eliminated. The negative feedback mechanism is explained as follows:

1. Given a value of the peak control voltage $V_P$, the NMOS transistor 533 will set an upper bound for the output current $I_{OUT}$. When the single stage PFC constant average current converter 520 allows a current value higher than the upper bound for the output current $I_{OUT}$ during a high voltage interval of the full-wave-rectified line input voltage $V_{IN}$, the drain of the NMOS transistor 533 will exhibit a high impedance and the output current $I_{OUT}$ will be equal to the upper bound. When the single stage PFC constant average current converter 520 cannot allow a current value higher than the upper bound for the output current $I_{OUT}$ during a low voltage interval of the full-wave-rectified line input voltage $V_{IN}$, the second NMOS transistor 533 will enter a triode region and the value of the output current $I_{OUT}$ will be determined by the single stage PFC constant average current converter 520, and a corresponding valley value of the output current $I_{OUT}$ will be automatically determined to make the average value of the output current $I_{OUT}$ equal to the first preset value.

2. When the first voltage $V_1$ is higher than the second voltage $V_2$, the comparison signal $V_{CMP}$ will be at a high level to increase the peak control current $V_P$ to lower down the peak of the output current $I_{OUT}$. When the first voltage $V_1$ is lower than the second voltage $V_2$, the comparison signal $V_{CMP}$ will be at a low level to reduce the peak control voltage $V_P$, and the peak of the output current $I_{OUT}$ will shift up accordingly.

3. In steady state, the peak of the output current $I_{OUT}$ will be equal to the average value of the output current $I_{OUT}$, and the ripple of the output current $I_{OUT}$ is therefore reduced to near zero.

Figure 7:
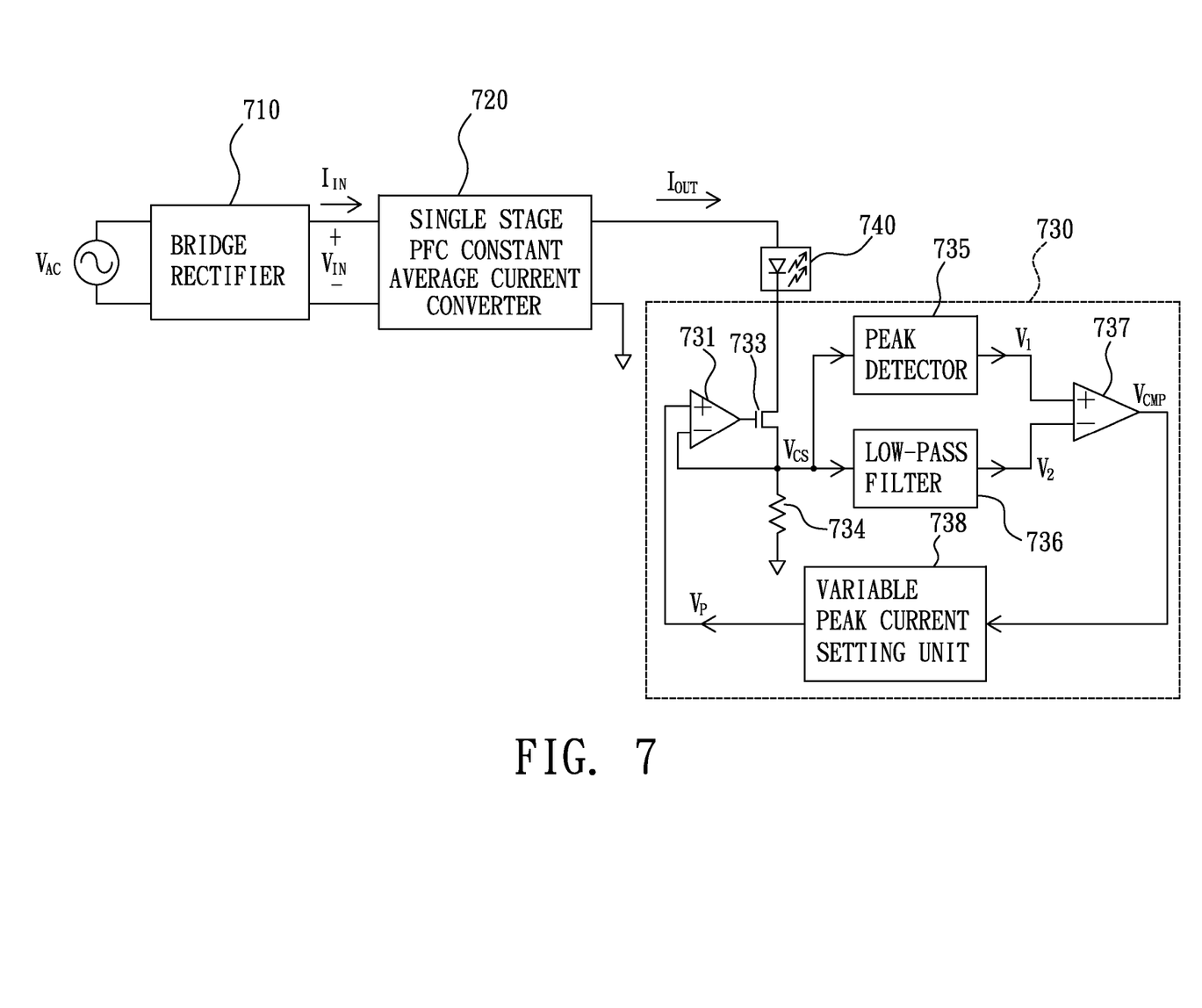
FIG. 7 illustrates a block diagram of a PFC LED driver having a flicker control mechanism according to still another preferred embodiment of the present invention.

FIG. 7 illustrates a block diagram of a PFC LED driver having a flicker control mechanism according to still another preferred embodiment of the present invention. As illustrated in FIG. 7, the PFC LED driver having a flicker control mechanism includes a bridge rectifier 710, a single stage PFC constant average current converter 720, and a current ripple reducing unit 730, and an LED module 740 is driven by the PFC LED driver.

The bridge rectifier 710 is used to generate a full-wave-rectified line input voltage $V_{IN}$ according to an AC power $V_{AC}$.

The single stage PFC constant average current converter 720, coupled with the bridge rectifier 710, is responsible for forcing an input current $I_{IN}$ to track the full-wave-rectified line input voltage $V_{IN}$ and regulating the average value of an output current $I_{OUT}$ at a first preset value. The single stage PFC constant average current converter 720 can be of a buck type, a buck-boost type, or a fly-back type.

The current ripple reducing unit 730, in series with the LED module 740 to form a load for the output current $I_{OUT}$ to flow through, has a negative feedback control mechanism for forcing a peak of the output current $I_{OUT}$ to approach an average value of the output current $I_{OUT}$ to reduce the current ripple of the output current $I_{OUT}$, and thereby reduce the flicker of the LED module 740. The principle is as follows:

When in operation, the single stage PFC constant average current converter 720 will force the input current $I_{IN}$ to be in phase with the full-wave-rectified line input voltage $V_{IN}$, and make the average value of the output current $I_{OUT}$ approach the first preset value. In the mean time, the current ripple reducing unit 730 uses a negative feedback control mechanism to force the peak of the output current $I_{OUT}$ to approach the average value of the output current $I_{OUT}$. As a result, the ripple of the output current $I_{OUT}$ decreases to nearly zero, and in this situation, the ripple of the input current $I_{IN}$ is forced to be absorbed by a capacitor (typically 100-200 μF) in the single stage PFC constant average current converter 720.

The current ripple reducing unit 730 includes a first amplifier 731, a first NMOS transistor 733, a first resistor 734, a peak detector 735, a low-pass filter 736, a comparator 737, and a variable peak current setting unit 738.

The first amplifier 731 has a first negative input, a first positive input, and a first output. The first NMOS transistor 733 has a first gate, a first drain, and a first source, the first gate being coupled with the first output of the first amplifier 731, the first drain being coupled with the LED module 740, and the first source being coupled with the first negative input of the amplifier 731. The first resistor 734 has one end coupled with the first source of the first NMOS transistor 733, and another end coupled to a ground.

The peak detector 735 has an input coupled with the first source of the first NMOS transistor 733, and an output for providing a first voltage $V_1$ corresponding to a peak value of the output current $I_{OUT}$.

The low-pass filter 736 has an input coupled with the first source of the NMOS transistor 733, and an output for providing a second voltage $V_2$ corresponding to an average value of the output current $I_{OUT}$.

The comparator 737 has a positive input for receiving the first voltage $V_1$, a negative input for receiving the second voltage $V_2$, and an output for providing a comparison signal $V_{CMP}$.

The variable peak current setting unit 738 has an input for receiving the comparison signal $V_{CMP}$, and an output for providing a peak control voltage $V_P$ to the positive input of the first amplifier 731, wherein the peak control voltage $V_P$ decreases/increases as a high level period of the comparison signal $V_{CMP}$ increases/decreases.

Figure 8:
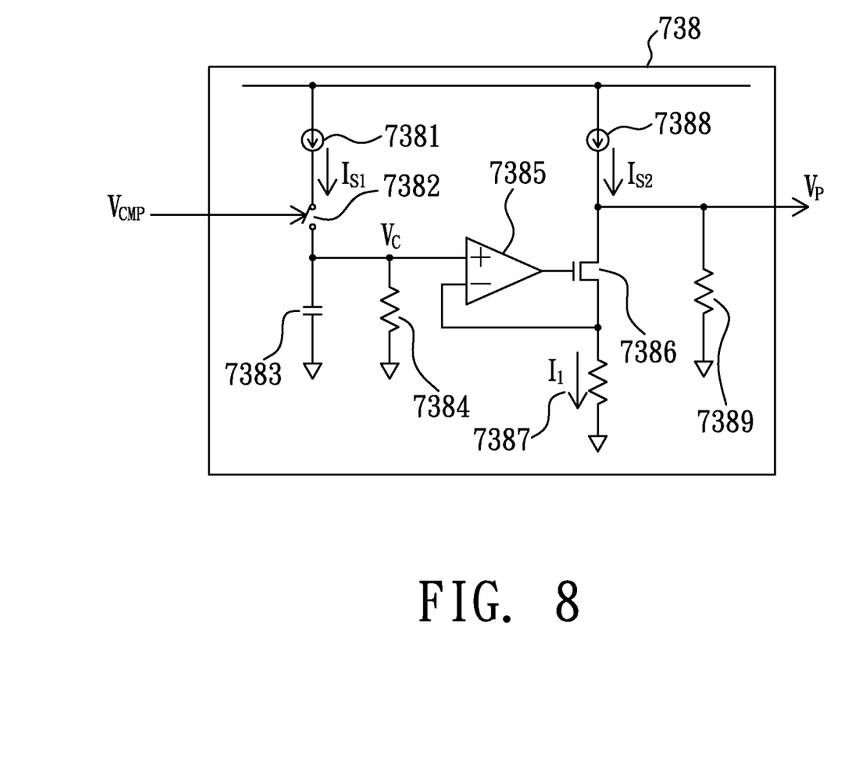
FIG. 8 illustrates one embodiment of a variable peak current setting unit of FIG. 7.

FIG. 8 illustrates one embodiment of the variable peak current setting unit 738. As illustrates in FIG. 8, the variable peak current setting unit 738 includes a first current source 7381, a switch 7382, a capacitor 7383, a second resistor 7384, a second amplifier 7385, a second NMOS transistor 7386, a third resistor 7387, a second current source 7388, and a fourth resistor 7389.

The first current source 7381 has an output for providing a first constant current $I_{S1}$.

The switch 7382 has a control end, a first channel end, and a second channel end, the control end being used for receiving the comparison signal $V_{CMP}$, and the first channel end being coupled with the output of the first current source 7381.

The capacitor 7383 has one end coupled with the second channel end, and another end coupled to the ground.

The second resistor 7384 has one end coupled with the second channel end, and another end coupled to the ground.

The second amplifier 7385 has a second positive input, a second negative input, and a second output, the second positive input being coupled with the second channel end.

The second NMOS transistor 7386 has a second gate, a second drain, and a second source, the second gate being coupled with the second output of the second amplifier 7385, the second drain being coupled to the output of the variable peak current setting unit 738, and the second source being coupled with the second negative input of the second amplifier 7385.

The third resistor 7387 has one end coupled with the second source, and another end coupled to the ground.

The second current source 7388 has an output for providing a second constant current $I_{S2}$, the output of the second current source 7388 being coupled with the output of the variable peak current setting unit 738.

The fourth resistor 7389 has one end coupled with the second drain, and another end coupled to the ground.

When the comparison signal $V_{CMP}$ is at a high level, the switch 7382 will be switched on, and the first constant current $I_{S1}$ will charge the capacitor 7383 to generate a voltage $V_C$, which in turn causes a current $I_1$ to through the third resistor 7387, wherein $I_1=V_C/$(the resistance of the third resistor 7387), and $V_C$ is proportional to the period the comparison signal $V_{CMP}$ stays at the high level. As the peak control voltage $V_P$ is equal to $(I_{S2}-I_1)\times$(the resistance of the fourth resistor 7389), therefore, the longer the comparison signal $V_{CMP}$ stays at the high level, the smaller the peak control voltage $V_P$ will be.

In conclusion, by virtue of the designs proposed above, the present invention possesses the advantages as follows:

1. The PFC LED driver of the present invention is capable of reducing the current ripple of LEDs to prevent a flicker phenomenon.
2. The PFC LED driver of the present invention is capable of reducing the current ripple of LEDs to improve the luminous efficiency without compromising the power factor.
3. The PFC LED driver of the present invention can be implemented with a low cost and a small size.
4. The PFC LED driver of the present invention is easy to design.

While the invention has been described by way of example and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. A PFC LED driver having a flicker control mechanism, comprising:
    a bridge rectifier, used to generate a full-wave-rectified line input voltage according to an AC power;
    a single stage PFC constant average current converter, coupled with said bridge rectifier and used for forcing an input current to track said full-wave-rectified line input voltage and regulating an average value of an output current at a first preset value;
    a current ripple reducing unit, in series with an LED module to form a load for said output current to flow through, wherein said current ripple reducing unit has a negative feedback control mechanism for forcing a peak of said output current approach an average value of said output current;
    a first NMOS transistor, having a first gate, a first drain, and a first source, said first gate being coupled with said first drain;
    a first resistor, having one end coupled with said first source, and another end coupled to a ground;
    a second NMOS transistor, having a second gate, a second drain, and a second source, said second gate being coupled with said first gate, and said second drain being coupled with said LED module;
    a second resistor, having one end coupled with said second source, and another end coupled to said ground;
    a peak detector, having an input coupled with said second source, and an output for providing a first voltage corresponding to a peak value of said output current;
    a low-pass filter, having an input coupled with said second source, and an output for providing a second voltage corresponding to an average value of said output current;
    a comparator, having a positive input for receiving said first voltage, a negative input for receiving said second voltage, and an output for providing a comparison signal; and
    a variable peak current setting unit, having an input for receiving said comparison signal, and an output coupled with said first drain for providing a peak control current, wherein said peak control current increases/decreases as a high level period of said comparison signal decreases/increases.

2. The PFC LED driver having a flicker control mechanism as claim 1,
    wherein said peak detector comprises:
    a diode, having an anode coupled with said second source, and a cathode coupled to said output of said peak detector;

a first capacitor, having one end coupled with said cathode of said diode, and another end coupled to said ground; and a discharging resistor, having one end coupled with said cathode of said diode, and another end coupled to said ground.

3. The PFC LED driver having a flicker control mechanism as claim 1, wherein said low-pass filter comprises:

a third resistor, having a first end coupled with said second source, and a second end coupled to said output of said low-pass filter; and a second capacitor, having one end coupled with said second end of said third resistor, and another end coupled to said ground.

4. The PFC LED driver having a flicker control mechanism as claim 1, wherein said variable peak current setting unit comprises:

a first current source, having an output for providing a first constant current;

a switch, having a control end, a first channel end, and a second channel end, said control end being used for receiving said comparison signal, and said first channel end being coupled with said output of said first current source;

a third capacitor, having one end coupled with said second channel end, and another end coupled to said ground;

a fourth resistor, having one end coupled with said second channel end, and another end coupled to said ground;

an amplifier, having a positive input, a negative input, and an output, said positive input being coupled with said second channel end;

a third NMOS transistor, having a third gate, a third drain, and a third source, said third gate being coupled with said output of said amplifier, said third drain being coupled to said output of said variable peak current setting unit, and said third source being coupled with said negative input of said amplifier;

a fifth resistor, having one end coupled with said third source, and another end coupled to said ground; and a second current source, having an output for providing a second constant current, said output of said second current source being coupled with said output of said variable peak current setting unit.

* * * * *